March 20, 1945.  G. E. NERNEY  2,371,910
EYEGLASS CONSTRUCTION
Filed Jan. 5, 1943
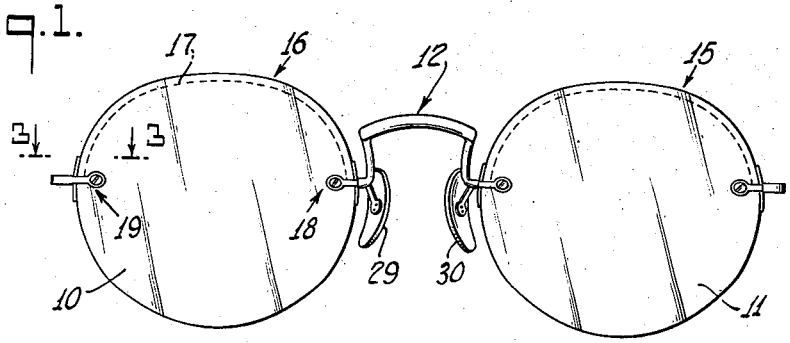
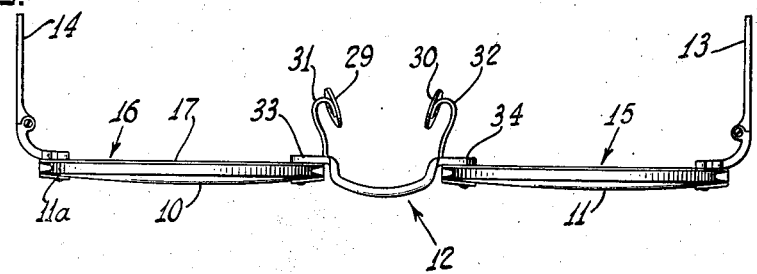
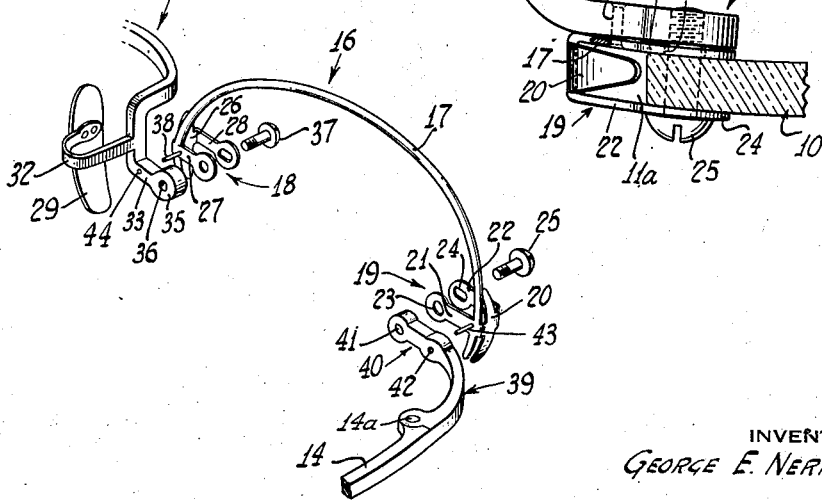
INVENTOR
GEORGE E. NERNEY
BY
Blair, Curtis + Hayward
ATTORNEYS

UNITED STATES PATENT OFFICE 2,371,910

EYEGLASS CONSTRUCTION

George E. Nerney, Attleboro, Mass., assignor to Bay State Optical Company, Attleboro, Mass., a corporation of Maine Application January 5, 1943, Serial No. 471,377

5 Claims. (Cl. 88—41)

This invention relates to eyeglass construction.

One of the objects of this invention is to provide a new and improved eyeglass construction. Another object is to provide a construction of the above character which is simple, practical, and thoroughly durable. Another object is to provide a construction of the above character which is neat and attractive in appearance. Another object is to provide a construction of the above character, the strength of which is greatly increased due to the durability and lasting quality of the more vulnerable portions thereof. Another object of this invention is to provide a construction of the above character which is strong and well able to withstand the strains of hard usage. Another object is to provide a construction of the above character wherein the individual parts, as well as their particular construction, are so designed as to reduce expenditure of materials or the like. A further object is to provide a construction of the above character which is readily adjustable to lenses of different shapes. A still further object is to provide a construction of the above character on which lenses may be easily and quickly mounted by the retailer. Still another object is to provide a construction of the above character in which a secure and even grip by the saddles on the lens faces is assured. Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 is a front elevation of an eyeglass frame having the lenses mounted therein;

Figure 2 is a top plan view of the eyeglass frame shown in Figure 1, the temples being cut off;

Figure 3 is a top plan view, on an enlarged scale, of a portion of the frame shown in Figure 1; and, Figure 4 is an exploded perspective view, on an enlarged scale, of a portion of the frame shown in Figure 1.

Similar reference characters refer to similar parts throughout the several views of the drawing.

As conducive to a clearer understanding of certain features of this invention, it might here be pointed out that lens fractures are often caused by the fact that many frames are not constructed to transmit the strains placed upon them in use evenly to the lenses. Furthermore, because of their construction, it is difficult for the retailer to mount the lenses on many types of saddles, and the expense of servicing these improperly constructed saddles must be borne by the retailer. A further difficulty experienced by retailers lies in the fact that they must carry a large number of different sizes of a frame in order to be able to fit the varying sizes called for in prescriptions. It is another object of this invention to provide a construction which may be assembled by the retailer and which eliminates the retailer's necessity of carrying a full line of sizes in complete frames. Accordingly, it is another object of this invention to overcome the above-mentioned difficulties, as well as many others.

It might here be noted that reference hereinafter to an "outward" direction signifies a direction to the left or right of the bridge of an eyeglass frame in the direction of the temples, while the term "inward" denotes a direction opposite thereto. A "rearward" direction refers to a direction toward the face of the wearer, whereas the term "forward" denotes the opposite direction. An "upward" direction refers to a direction upwardly from the face of the wearer, while a "downward" direction is opposite thereto.

Referring now to Figures 1 and 2 of the drawing, there is shown a pair of spectacles including a pair of lenses 10 and 11, a bridge generally indicated at 12, temples 13 and 14, and lens supporting members generally indicated at 15 and 16. As the construction of the frame is substantially similar to the left and right of the center of the bridge, as viewed in Figure 1, the description of the frame will be limited to the left-hand portion of the frame, as viewed in this figure.

Referring to Figures 1, 2, and 4, lens supporting member 16 includes a brace member 17 which extends between, and is connected to, a pair of saddles generally indicated at 18 and 19. Brace member 17 is preferably made of resilient wire. When the lenses are mounted on the frame, brace member 17 (Figure 2) is positioned adjacent the rear face of the lens, and its upper edge follows the upper periphery of lens 10 (Figure 1). As saddles 18 and 19 of lens supporting member 16 are substantially similar in construction, the description will be limited to the construction of saddle 19.

Saddle 19 (Figures 3 and 4), which is preferably constructed from thin resilient sheet metal, includes a leaf spring portion 20 having a pair of integral ears 21 and 22 formed thereon. The upper and lower portions of leaf spring portion 20 extend upwardly and downwardly along and contact the lens edge 11a (Figures 1 and 3). The inner end portions of ears 21 and 22 are enlarged, are cup-shaped, and have holes 23 and 34 formed therein through which the lens screw 25 passes when a lens is mounted upon the frame. Hole 23 is preferably of slightly greater diameter than the shank of screw 25, and hole 24 is preferably oval-shaped, the width of this hole being slightly greater, while its length is substantially greater, than the diameter of the shank of screw 25. This materially aids in obtaining a snug fit between the lens and the saddle when the two are assembled, all as will be disclosed fully hereinafter.

Saddle 18 (Figure 4) which is substantially similar to saddle 19, includes a leaf spring portion 26 and a pair of ears 27 and 28. The ends of brace member 17, which is preferably constructed of a resilient metal, are connected to the upper edges of ears 21 and 27 adjacent the leaf spring portions 20 and 26 of saddles 19 and 18 in any suitable manner, such as by soldering. Thus, brace member 17 and saddles 18 and 19 form an integral lens supporting unit 16.

Bridge 12 (Figures 2 and 4) carries (Figures 1 and 2) a pair of nosepads 29 and 30 which may be mounted upon the bridge in any suitable manner, such as by nosepad arms 31 and 32. Bridge 12 carries arms 33 and 34 which extend outwardly over the faces of lenses 10 and 11 adjacent the rear ears of the saddles when the lenses are mounted on the frame.

Referring to Figure 4, bridge arm 33 carries an enlarged end portion 35 through which a threaded hole 36 extends. Threaded hole 36 carries threads complementary to the threads upon lens screw 37. Another hole 44 extends through the inner portion of arm 33 and is adapted to receive a pin 38 which is secured to ear 27 of saddle 18 adjacent the leaf spring portion thereof in any suitable manner, such as by soldering.

Temple 14 (Figures 3 and 4) is pivotally connected to an endpiece, generally indicated at 39, by a screw 14a. The endpiece has an inwardly extending arm portion, generally indicated at 40, formed thereon, the inner end of which is enlarged and has a hole 41 extending therethrough. Hole 41 is threaded with threads complementary to the threaded portion of lens screw 25. Another hole 42 is formed in the arm 40 which is adapted to receive a pin 43 secured to ear 21 of saddle 19 adjacent the leaf spring portion thereof.

In assembly, pins 38 and 43 may either extend through holes 44 and 42 and be headed over in countersunk portions of the holes (Figure 3), or, if the frame is to be assembled by the retailer, the frame is shipped in its individual parts, as shown in Figure 4, all as will be described more fully hereinafter. When the frame is assembled by the manufacturer, and pins 38 and 43 headed over in holes 44 and 42, the lenses are inserted in the saddles so that brace members 17 follow the upper periphery of lenses 10 and 11. To mount lens 10 lens screws 25 and 37 are passed through the holes in the saddle ears and lens and threaded into the ends of arms 33 and 40. As the screw is tightened, the resilient ears are pulled in until they are flush with the lens surfaces, thus assuring a snug fit. Because of the oval shape of the holes in the forward ears 22 and 28, movement of the ear with respect to the screw head is permitted so that the saddle can adjust itself to lenses and lens edges of different shapes, thus insuring the correct mounting of the saddles upon the lenses.

When the frame is shipped to the retailer before assembly, the retailer may be supplied with a few endpieces and bridges and with a complete line of sizes in the lens supporting members 15 and 16 of this construction. Then the retailer can assemble whatever size frame is required by selecting the correct size of lens supporting member. Thus, the retailer is not required to carry a complete line of sizes of complete frames of this type in stock. In assembly, the pins may either be secured by the retailer in the holes in the arms of the endpieces and the bridge, or he may insert the pin in the hole and then use the lens screws to hold the lens supporting members, bridge, and endpieces in assembled relationship. Thus, a frame is disclosed which may be carried by the retailer with a minimum of expense.

When the frame is in use, because of the interconnection of the saddles by the brace members, strains placed upon the frame at any point are passed through the brace members to other portions of the frame. This spreading of the strain throughout the frame materially aids in preventing fractures. Furthermore, by the construction of the saddles as described hereinabove, the applicant obtains a snug fit between the saddle and the lens, preventing uneven strain being placed upon the lens at any point covered by the saddle. Also, by placing the point of attachment of the saddles to the arms of the bridge or endpiece adjacent the leaf spring portion of the saddle, both ears are free to move and resiliently adjust themselves to the faces of the lenses as the lens screws are set. Thus, a snug fit between the saddles and lenses is assured, movement of the lens upwardly and downwardly is resiliently resisted by the leaf spring portions of the saddles, and strains are spread throughout the frame through the direct connection of the brace members to the saddles.

It will thus be seen that I have provided a thoroughly practical and efficient construction in which the several objects mentioned above, as well as many others, have been successfully and efficiently accomplished.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, a pair of lenses, a bridge member, a pair of endpieces, a pair of temples connected to said endpieces, arm members formed on said bridge member, an arm member formed on each of said endpieces, a pair of saddles connected to said bridge arm members, a saddle connected to each of said endpiece arm members, said saddles each including a resilient leaf spring section having a pair of resilient ears integrally formed thereon, said arm members extending over the rear faces of said lenses adjacent the ears of each of said saddles, a pair of brace members, said brace members each connecting an ear of a bridge saddle and an ear of an endpiece saddle, the point of connection of each of said brace members to its saddles being adjacent the point of connection of the ear to which the brace is connected to the saddle's leaf spring section and means connecting said lenses to said saddles.

2. In eyeglass construction, in combination, a pair of lenses, a bridge member, a pair of endpieces, a pair of temples connected to said endpieces, arm members formed on said bridge member, an arm member formed on each of said endpieces extending over the face of its lens, a pair of saddles connected to said bridge member, a saddle connected to each of said endpieces, said saddles each including a resilient leaf spring section having a pair of resilient ears connected thereto, said arm members extending over the rear faces of said lenses adjacent ears of each of said saddles, a pair of brace members, said brace members each being integrally connected to an ear of a bridge saddle and to an ear of an endpiece saddle, said saddles each being connected to said arm members at a single point adjacent the point of connection of one of the ears of each saddle to the leaf spring section of the saddle and remote from the end of the ear, whereby the remaining portions of said last-mentioned ears are permitted freedom of movement with respect to said arm member, and screw means connecting said ears and said lenses to said arm members.

3. In eyeglass construction, in combination, a bridge member, a pair of endpieces, a pair of temples pivotally connected to said endpieces, a pair of saddles connected to said bridge member, a saddle connected to each of said endpieces, said saddles each including a resilient leaf spring section and a pair of resilient ears integrally connected thereto, the point of connection of each of said saddles to the bridge member or endpiece to which it is connected being on an ear adjacent the point of connection of the ear to the leaf spring section of the saddle, and a pair of brace members, said brace members each connecting the last-mentioned ears of a bridge and an endpiece saddle.

4. In eyeglass construction, in combination, a bridge member, a pair of endpieces, a pair of temples pivotally connected to said endpieces, a pair of saddles connected to said bridge member, a saddle connected to each of said endpieces, said saddles each including a resilient leaf spring section and a pair of resilient ears integrally connected thereto, the point of connection of each of said saddles to the bridge member or endpiece to which it is connected being on an ear adjacent the point of connection of the ear to the leaf spring section of the saddle, and a pair of brace members, said brace members each connecting the last-mentioned ears of a bridge and an endpiece saddle, the point of connection of said brace members to said ears being immediately adjacent the point of connection of said ears to said endpieces and bridge members.

5. In eyeglass construction, in combination, a pair of lenses, a bridge member, a pair of endpieces including arm portions extending inwardly substantially parallel to the faces of said lenses, a pair of bridge members having arm portions extending outwardly over and substantially parallel to the faces of said lenses, a pair of saddle members each including a pair of ears, a pair of brace members, said brace members each being integrally connected to an ear of an endpiece saddle and an ear of a bridge member saddle, screw means extending through the ears of each of said saddle members to its related arm member, pin means formed on each of said saddle members remote from the points at which said screw means pass through the ears thereof, said pin means on each saddle member being positioned in a hole in the arm portion related thereto when said saddle members and arm members are in assembled relationship.

GEORGE E. NERNEY.